United States Patent [19]

Faulkner

[11] 4,244,788
[45] Jan. 13, 1981

[54] TRANSDUCER-PLATED MAGNETICALLY ANISOTROPIC METALLIC RECORDING FILMS, AND ASSOCIATED TECHNIQUES

[75] Inventor: John P. Faulkner, Thousand Oaks, Calif.

[73] Assignee: Burroughs Corporation, Detroit, Mich.

[21] Appl. No.: 115,988

[22] Filed: Jan. 28, 1980

Related U.S. Application Data

[63] Continuation of Ser. No. 957,158, Nov. 2, 1978, abandoned, which is a continuation of Ser. No. 807,154, Jun. 16, 1977, Pat. No. 4,144,160.

[51] Int. Cl.³ .................. C25D 5/02; C25D 5/04; C25D 3/56
[52] U.S. Cl. .................. 204/15; 204/23; 204/43 T
[58] Field of Search .......... 204/15, 23, 43 R, 43 T, 204/25, DIG. 5; 427/132; 346/137

[56] References Cited

U.S. PATENT DOCUMENTS

| | | | |
|---|---|---|---|
| 1,965,399 | 7/1934 | Wehe | 204/DIG. 5 |
| 3,027,309 | 3/1962 | Stephen | 204/43 T |
| 3,065,105 | 11/1962 | Pohm | 204/43 T |
| 3,186,932 | 6/1965 | Gelfand | 204/5 |
| 3,516,860 | 6/1970 | Simmons | 427/132 |

OTHER PUBLICATIONS

Journal of the Electrochemical Society, vol. 119, No. 1, Jan. 1972, pp. 51–56.

*Primary Examiner*—T. M. Tufariello
*Attorney, Agent, or Firm*—John J. McCormack; Nathan Cass; Kevin R. Peterson

[57] ABSTRACT

Described are thin magnetic recording films having "uniaxial anistropy" which are deposited using a magnetic plating head and plating anode, both disposed in cooperative relation adjacent the substrate-cathode, to comprise a "plating transducer". This transducer may be translated across the substrate and so sweep the "magnetic-gap" field thereacross as to align the plated material while it is being deposited.

35 Claims, 6 Drawing Figures

TRANSDUCER-PLATED MAGNETICALLY ANISOTROPIC METALLIC RECORDING FILMS, AND ASSOCIATED TECHNIQUES

CROSS REFERENCE TO RELATED APPLICATIONS

This is a continuation of application Ser. No. 957,158, filed Nov. 2, 1978, now abandoned, which is a continuation of Ser. No. 807,154 filed in the U.S. Patent and Trademark Office on June 16, 1977 for Method and Apparatus For Electro-Deposition of Magnetically Anisotropic Metallic Recording Films on behalf of the same inventor, commonly assigned, now U.S. Pat. No. 4,144,160 and herewith incorporated by reference.

BACKGROUND OF THE INVENTION

This invention is directed to improvements in plated film products and to associated techniques; more particularly it is directed to thin electroplated metal magnetic recording films having improved magnetic properties.

INTRODUCTION

Workers versed in the art of making and/or using magnetic recording media are aware of apparatus employing thin magnetic coatings in various forms, such as on tape, disks, drums, and the like, wherein a ferromagnetic coating is applied as a thin film on a non-ferromagnetic carrier. Various magnetic signals may be magnetically recorded on such films and the magnetic characteristics of the coating will determine how much (and what type) information may be recorded in a given film area.

In high speed data processing systems and the like, it is common to employ magnetic recording apparatus, such as disk systems, for receiving and recording data. Such disks must be capable of high "recording density"; that is, the amount of data to be stored on a prescribed tiny area on the disk must be enormous; therefor, the magnetic recording film on such disks, must have a thickness and related magnetic properties and surface characteristics that are exceptionally uniform over the entire recording area. Producing improved high-density magnetic recording films on magnetic disks, or like media, is a principle object of this invention. Also described are improved electroplating methods and apparatus adapted to electroplate such magnetic films so that they exhibit superior recording qualities, such as uniaxial magnetic anisotropy.

Forming Magnetic Recording Media

Magnetically anisotropic media are those in which the magnetic properties of the medium vary with direction in the plane of the film. It is known to electrodeposit low coercivity anisotropic thin films of ferromagnetic alloys, (e.g., for memory cells) such as "permalloy", by plating or vapor-depositing the alloys in the presence of a magnetic field. The easy axis of magnetization of the electrodeposit will be aligned in the direction of the magnetic field. Planar films have been so plated using a flat field generated by a pair of Helmholtz coils in the plane of the cathode. Also, films have been plated on wires by plating the wire in the field on the axis of a solenoid coil.

Other ways are known to magnetically orient the domains of a magnetic film. For example, when an "oxide disk" is manufactured, with the slurry containing ferromagnetic particles (e.g., gamma iron oxide) spread on a metal disk substrate, an ordinary bar magnet, or like field source, may be drawn across the wet coating to magnetically "orient" domains, insofar as possible, before the coating hardens. This has been done with nickel-iron (particle) coatings, of "low $H_c$" (order of less than 300-400 Oe.), though not as successfully as desired (e.g., typically only about 60% of the domains can be so oriented in an "annular" direction, along disk tracks).

However, such alignment is to date, problematical for high $H_c$ magnetic recording films, especially where the alignment must be along "annular tracks" (e.g., as with the concentric tracks of a magnetic recording disk). The problem is intensified in recording films of very high bit density—a segment of the art that is growing very rapidly. Moreover, it is also problematic to plate and pre-align magnetic domains along arcuate tracks; no really practical method has yet appeared for so electrodepositing thin films of high coercivity alloys in a "pre-aligning" magnetic field, (i.e., a field sufficiently intense and so directed as to produce a magnetically anisotropic metal film with its "easy axis" pre-oriented); and no one has taught how to do this along disk tracks where the pre-alignment is "along the track", i.e., "annularly", or in the direction of relative motion between the magnetic medium and recording head about a disk (or, similarly, parallel to the length of a tape so plated, or else circumferentially about a drum so plated). The purpose of the present invention is to do these things, using a combination "gapped-magnet/plating electrode" array.

It should be noted that the oriented magnetic-particle dispersion media (e.g., "oxide coatings") which are widely employed on disks and tapes are not truly "anisotropic". These media are formed by dispersing prefabricated acicular crystals of ferromagnetic, or ferrimagnetic, materials in a solution of polymeric material,—then, coating the dispersion onto a substrate, permitting the solvent to evaporate and, last, drying (and/or polymerizing) the organic binder. At the present time the magnetic pigment of choice is acicular gamma-ferric oxide, a ferrimagnetic compound.

Now, each such acicular particle serves as a tiny bar magnet. After the dispersion is coated onto the substrate, and before it has fully dried, it is subjected to a suitably-directed magnetic field to force alignment of (some of) the particles with the field. However, magnetic interactions among the particles ("self-demagnetization") prevent anything approaching a full, 100% orientation of the particles; that is some particles remain unaligned. The retentivity of such media, as measured in the direction of orientation, is, at best, about twice that measured orthogonally. There is no appreciable difference in the coercivities measured in the two directions. Thus, such media are magnetically oriented, but not truly magnetically "anisotropic".

Workers recognize that the density of magnetic recording (and reproduction) achieved will depend heavily upon the "coercivity" of the medium. The information recorded in a film medium may be visualized as constituting many tiny "dipole" magnets magnetized in alignment so as to present their magnetic poles along a prescribed direction. Now, high density recording crowds many such magnets together and can readily be understood as inducing a "self-demagnetization", whereby the orientation of one magnet (i.e., alignment of its magnetic pole) induces an adjacent magnet to assume a like orientation. As workers know, raising a medium's coercivity lessens this tendancy toward demagnetization and avoids the associated loss of information. Thus, as recording density increases, the risk of "demagnetization" rises too (especially for low $H_c$ materials); so that (minimum) coercivity should be increased compensatorily.

However, increasing coercivity has the unfortunate consequence of increasing the minimum magnetic recording field necessary (to achieve satisfactory recording, assuming a prescribed transducer/medium combination). This is usually problematic, since increasing this magnetic field strength makes a recording head more complex and expensive to design and operate, especially for high speed data processing. Thus, it is typically desirable to minimize $H_c$ from the aspect of optimizing the transducer system; and to maximize $H_c$ from the aspect of increasing bit density.

The present invention is apt for relieving such problems, teaching the plating of high coercivity recording films to be "pre-oriented" with their "easy axis" pre-aligned along recording tracks and thus more fully anisotropic.

As workers well know, when a given transducer system is contemplated for use with a certain medium and a given recording mode, there will be an optimum combination to be found for such factors as: coercivity, squareness-ratio, remanence, and film thickness. The present invention facilitates meeting these objectives, while also accommodating an "along-track" pre-magnetization of plated films, even along arcuate tracks. The present invention provides an improved method and associated apparatus for electrodepositing "pre-oriented" magnetic recording film having improved, superior high density recording qualities—especially films having relatively high coercivity over a relatively wide range, while also accommodating relatively high squareness ratios and remanence.

Briefly, an embodiment of this invention involves methods and apparatus for plating high $H_c$ magnetic recording films to be automatically "pre-oriented" in a certain sense (i.e., with uniaxial magnetic anisotropy about annular disk tracks) and teaches a novel improved type of pre-oriented media associated.

In another aspect, the invention provides a method for pre-aligning the magnetic domains of a thin magnetic recording film along the plane of the medium—and particularly in a prescribed track direction—using a "gapped" magnetic circuit element (e.g., transducer) and associated plating electrode, translating these across the film carrier to plate the thin pre-aligned film—doing so even for arcuate recording tracks on disks and the like. Workers in the art know that it is new and useful to so electroplate pre-aligned magnetic recording films, especially high-density "high $H_c$" materials like cobalt alloys.

It is new, also, to so plate recording films using a recording head—i.e., with one plating electrode arranged cooperatively with (e.g., within) a magnetic recording transducer to form a magnet/electrode array, arranged and adapted to deposit film material under the aligning influence of its own magnetic field. This invention accomplishes the foregoing.

One object is to facilitate the cited features and advantages. Another object is to produce such media so as to be so "pre-oriented", with the "easy axis" oriented along the recording path and to derive associated features and advantages.

According to one aspect of this invention it is found that such results are achieved if one constructs an electroplating apparatus with the anode of the plating cell disposed in a magnetic transducer assembly, and disposing this assembly relative to a cathodic substrate, so that the plating current flowing therebetween and onto the substrate intercepts the magnetic field in the transducer's gap, at least on the substrate. Now, with this gap, in turn, disposed in close (plating) proximity to the substrate, it is possible to electro-deposit a uniaxially anisotropic recording film having its "easy axis" aligned with this field and along certain recording tracks.

The above, and other features and advantages of the present invention may be more clearly understood by reference to the following detailed description of embodiments thereof, especially when considered in conjunction with the accompanying drawings, wherein like reference indicia identify like elements:

FIGS. 2, 4 and 5 show the magnet-electrode in fragmentary partial section; while

DESCRIPTION OF PREFERRED EMBODIMENTS

Preliminary Considerations

Figure 1:
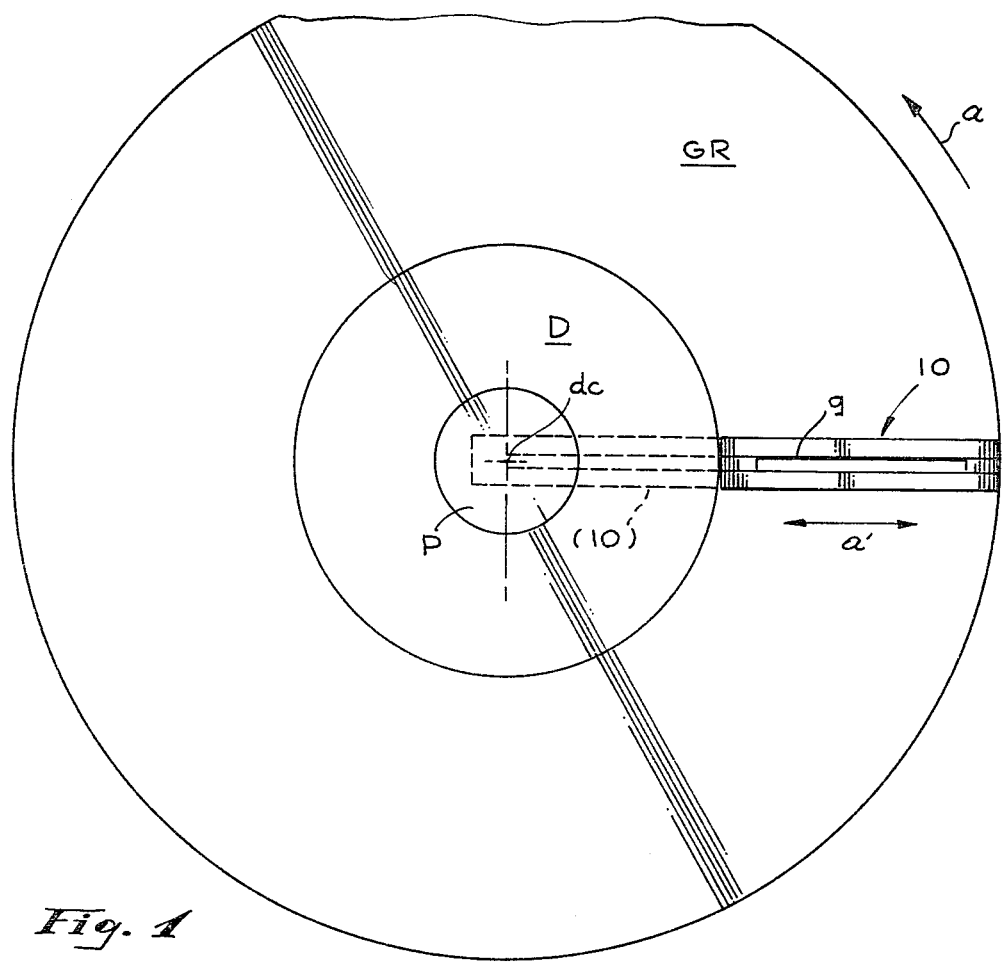
FIG. 1 is a plan view of a disk plating arrangement with a novel magnet-electrode arranged according to the invention.
Figure 2:
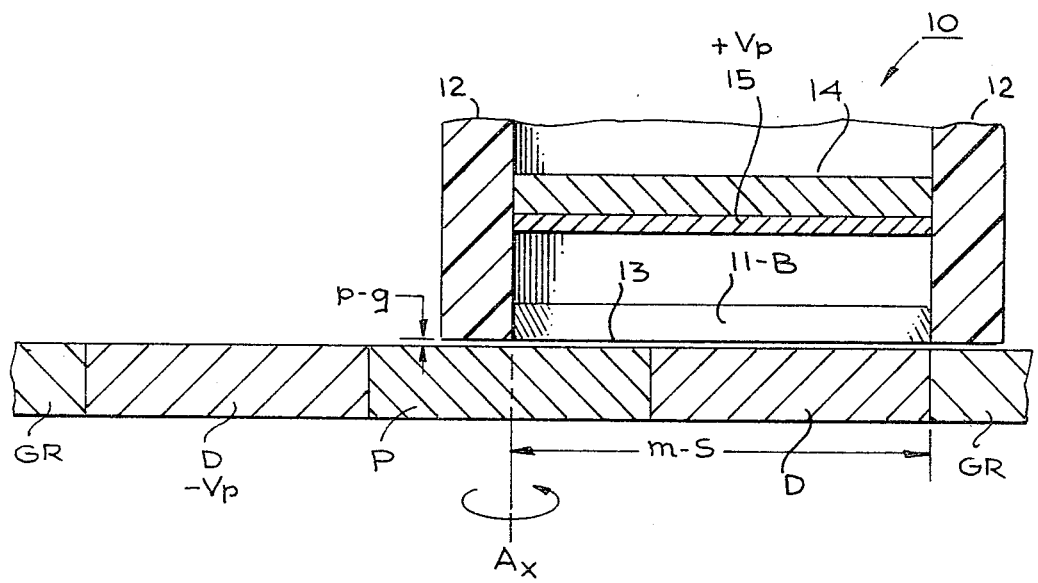
Figure 3:
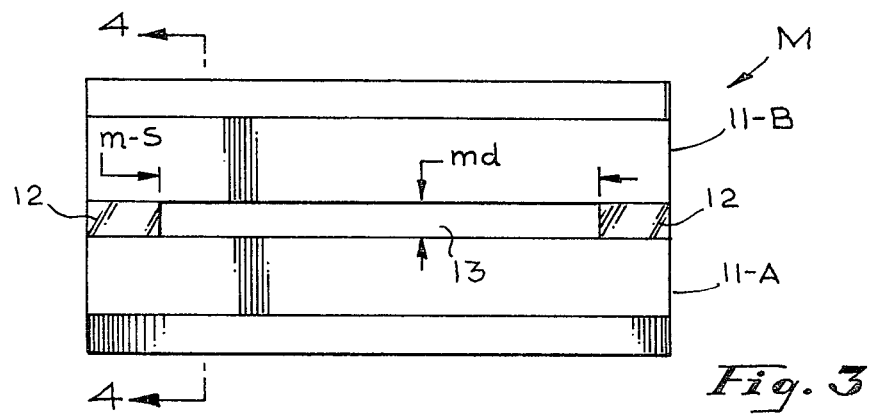
FIG. 3 shows it in plan view.
Figure 4:
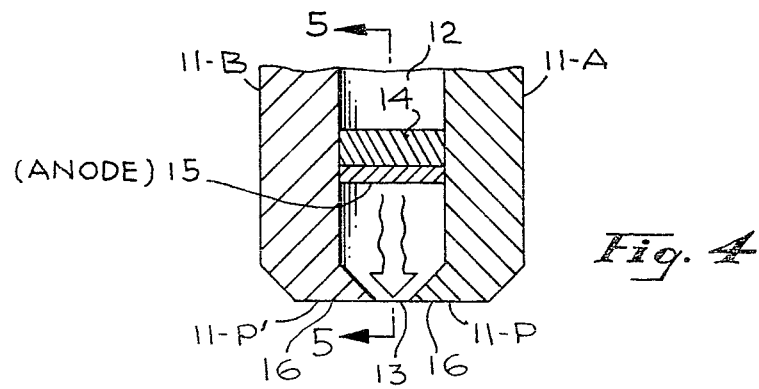
Figure 5:
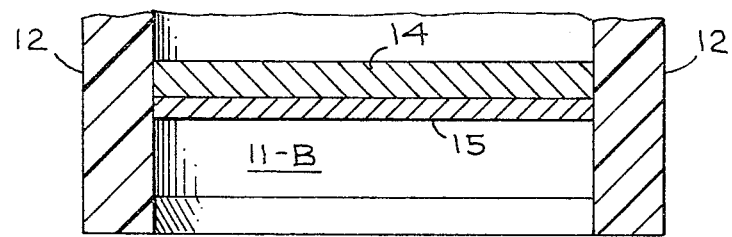

Now, I have found that, if two magnetic transducer heads having gaps oriented at 45° to the direction of media-travel, and at 90° to one another, are employed to record "1, 0" bit patterns along a single track of a metallic recording film, the information recorded by each head could be read by that head but not by the other head. When such a track is "double-recorded", the output of each head is about 70% of the output obtained when the track is "single recorded" and read-back by the recording head. This performance is consistent with an anisotropic magnetic structure in the medium whereby domain "coercivity" in the "easy direction", is of a magnitude which permits such switching by the recording field, while domain coercivity in the "hard" direction is such as to not permit such switching. Thus, recording fields directed to right angles to one another tend to switch different domains.

If such a structure could be converted to an anisotropic structure in which the easy direction of substantially all domains is directed along the recording path, a considerable increase in energy could be obtained without an increase in coercivity. In addition, reduction in dispersion of the easy axes would be possible.

First Embodiment (FIGS. 1-5)

I have devised a novel electroplating scheme for rendering such a pre-oriented plated film structure—doing so on a disk substrate and using a magnetic recording transducer/plating-anode combination to deposit such a film annularly along the arcuate tracks of the disk. This plating arrangement is indicated, rather generally, in FIG. 1, and described as follows:

This plating embodiment comprises a combination magnetic transducer/electrode assembly, or "magtrode", 10 comprising a "gapped magnet" M and anode 15, disposed above a rotatable multi-part cathodic substrate assembly K. Assembly K comprises a plateable recording disk D, a surrounding "Holder" GR, and a center plug P. Thus substrate assembly is adapted to be immersed in a plating tank containing a suitable plating electrolyte. This arrangement will be understood as adapted to electro-deposit the contemplated magnetic recording film onto this disk substrate in such a manner as to render it uniaxial and anisotropic along the annular tracks. As detailed below, this cathodic work-surface assembly is adapted to be rotated (indicated by arrow "a") relative to the transducing gap "g" of transducer/plating head 10, while the latter is adapted to be, the while, controllably translated radially fully across the recording radius of disk D (as indicated by arrow a', e.g., from position 10', in phantom, to 10 as shown in full-line, FIG. 1). In this fashion, it will be recognized that one may plate a uniform thickness over the entire disk—despite increasing disk area as one proceeds radially-out from center; the transport speed being adjusted to control plating time accordingly.

As better seen in FIGS. 2–5, transducer/plating head 10 comprises, essentially, the "gapped electromagnet electrode" combination; i.e., including a relatively conventional electromagnet transducer M including a pair of magnetic poles 11-a, 11-B (see FIGS. 3 and 4, especially) arranged and adapted to define a prescribed magnetic gap 13 of prescribed width m-s and length m-d, and presenting a prescribed magnetic field between the pole tips, along with a cooperatively disposed planar plating anode electrode 15. Anode 15 will be understood as adapted to operate electrolytically through gap 13 when the pole tips are disposed in an electrolyte and in plating-proximity with the cathodic work surface. Thus, plating ion migration to the cathodic surface can take place when the magnetic electrode array (pole tips 11-P, 11-P' thereof) are disposed in plating proximity with the flat cathodic plating surface such as to establish a prescribed plating gap p-g (see FIG. 2; ordinarily the order of a few mils, preferably about 5 mils here, with transducer gap length m-d about 100 mils or more—see specific embodiment, Example I, below).

Anode 15 comprises a conductive, non-magnetic metal piece [insoluble in electrolyte; e.g., preferably comprising a platinum coating 15 on a titanium substrate 14] presenting a flat electrode surface parallel with the cathode and bridging the gap between poles 11-A, 11-B, being adapted to project plating ions through transducer gap 13 to the cathode, where the magnetic field projected from gap 13 aligns them, as plating. Anode 15 is thus suitably charged, in the usual manner (by means not shown) and is electrically isolated for this purpose. Poles 11 of electro-magnet M are formed somewhat conventionally, as workers will understand, although an electrically insulating coating 16 is applied to the work-confronting tips, and to all other exposed surfaces of the magnet in order to confine the plating current path to the anode. The energizing coil, etc., are conventional and provided and operated as known in the art (not shown) to present the indicated magnetic field at the cathode.

The cathodic work surface, (i.e., the disk D, the annular metallic holder GR surrounding disk D and center hole plug P) will be understood as comprising a relatively flat, continuous, composite non-ferromagnetic metal surface adapted to be rotated, as a unit, as indicated, in the electrolyte, while coupled to cathodic potential (negative relative that of anode 15). Workers will understand that plug P, disk D and holder GR may comprise any plateable conductive, non-magnetic metal. As workers know, holder GR allows one to plate uniformly on disk D at constant current; and may be dispensed-with where "constant-voltage" plating is employed. One acceptable substrate is brass, another is aluminum, over-plated (electrolessly) with nickel. In this embodiment the surface is preferably rotated at relatively low rpm; preferably about 20 rpm (10–30 range preferred).

Cathodic surfaces D, P, and GR must form a flat essentially continuous surface confronting the anode surface, while the magnetic field from the transducer gap should be kept applied relatively parallel to this cathodic surface in a relatively narrow strip along the plating-zone (i.e., along a disk radius). The magnetic gap will be understood to maintain this "orienting-field-zone" relatively narrow along the cathodic surface, maintaining domain orientation relatively tangent to the associated track circumference (i.e., normal to associated radius). The related gap width m-s extends, in this embodiment, from the axis of disk-rotation Ax to just beyond the outer periphery of the disk. (See FIGS. 2, 3). Pole tips 16 are thus disposed in close (plating) proximity to this cathodic work surface,—on the order of a few mils, preferably—with the entire arrangement disposed in a suitable electroplating tank and immersed in the plating electrolyte. Electrical connections for the electromagnet and the plating anodes will be made (not shown) as known in the art.

With a constant plating current flowing between anode and cathode surfaces, this plating magnet is translated radially-out across the disk at a constant prescribed velocity, while the cathode surface is rotated relative thereto at a constant angular velocity. Plating continues until the innermost- (or trailing-) end of the magnet-gap passes beyond the outer edge of disk D (at least beyond the recording portion thereof). Workers will appreciate how convenient this is to plate a uniform thin film on disk D, with the magnetic domains aligned "annularly" and in the plane of the medium (i.e., along the annular concentric recording tracks of the disk).

Such a disk may be heavily plated by rotating it in multiple passes under one such plating magnet; or plating may often be carried out more efficiently (e.g., in a single pass) using a number of such plating magnets disposed circumferentially about the disk at different radial positions, and in magnetic, plating isolation from one another.

Now, head 10 will, as mentioned, be translated radially outward across disk D at a controlled rate so that each area on the disk "sees" the same total plating current. The constant electroplating current applied will be understood as producing a rather "spiral" magnetic film band, with the "easy axis" aligned along the annular track sites (these to be designated on the disk surface as known in the art and typically concentric about the center dc of disk rotation, see axis Ax). For instance, for an overall "plating-zone" (generally related to cross-section of transducer gap 13) on the order of about 7.5 inches × 0.25 inches, about 1 to 3 amperes per square foot plating current will be suitable for the film described.

Recapitulating, film plating is effected under a uniform high intensity magnetic field applied along the plating-zone with an electro-magnet plating/transducer 10. Alternatively, workers will recognize that one may employ a high intensity permanent magnetic, such as a cobalt samarian magnet, (rather than an electro-magnet)

to supply the orienting field. Of course, any such magnet will have a similar gap and be similarly combined with a like anode. Presentation of the aligning field on the substrate may be effected simply by dropping the magnet close to the substrate during such plating periods. Workers will contemplate other like "gapped-magnet" arrangements suitable for likewise applying the orienting field along the plating-zone.

Use of a magnet transducer in such a plating electrode assembly will be recognized as very novel as well as convenient. According to the electroplating baths used, one may thus plate films with coercivities over a wide range, but preferably "high" coercivity films, from about 300–400 to 1000 Oe. An example of suitable plating methods follows.

Example I: Co-Ni-P film plated with annular pre-orientation on disk D

To deposit an illustrative cobalt-nickel-phosphorous recording film on disk D (FIGS. 1–5), workers in the art will contemplate apt plating methods and associated apparatus (including plating bath, plating conditions), these being adapted, as understood in the art (e.g., as described below) to this situation. The subject description will be understood as to be supplemented with what is commonly known to workers skilled in the art, insofar as that does not conflict with what is described herein. In particular, workers will note that the translation of the cathodic work relative to the magnet-electrode will likely induce significant turbulence adjacent the deposit sites; accordingly the selected plating method must take this into account.

Here, in the illustrative plating mode, and assuming a current density of about 45 ASF and a cathode efficiency of about 90%, about 40.3 minutes of plating is required to render an 8 u-in. film on disk D, disk D being rotated at 10–30 rpm, with gap "g" translated at about 0.003 in/min, withdrawal velocity. With this system, only that portion of the disk surface which lies opposite the plating gap, is being plated at any one instant, of course.

Computation of "Plating-Time"

The plating time required to deposit the recording film along a given radius on the disk is given by the relation:

TABLE I $$T = 13.4 \frac{2\pi R}{W} \qquad \text{Eq. \#1}$$

Where:
R = the chosen disk radius, in inches (here: 7.25 in.)
W = the width of the plating aperture. (Here, this is transducer gap length; about 0.25×7.5 in. or about 1.9 in.)
T = the time, in seconds, required to plate the entire film at radius R; i.e., "magnet traverse-time".

Thus, here T is 40.3 minutes.

Since the time required for the innermost end of the plating aperture to traverse the distance from the axis of rotation of the disk to the chosen radius of the disk is T, the rate of traverse $\gamma$ is given by:

$$\gamma = R/T \qquad \text{Eq. \#2}$$

Where:

$\gamma$ = the rate of traverse, in inches/second
R = the chosen radius, in inches (here, 7.25 in.)
T = the time of traverse, in seconds, calculated by Equation 1. (Here, 40.3 min.)

Thus, here, $\gamma$ is about 0.003 inches/second. For a plating current-density of 45 ASF, the plating current is given by:

$$C = 45 \, LW/144 \qquad \text{Eq. \#3}$$

Where:
C = the plating current, in amperes
L = the length of the plating aperture, in inches
W = the width of the plating aperture, in inches In the above example, it is assumed that the O.D. of the disk is 14.5 inches an, the O.D. of the outer guard ring is 29 inches and the plating head has a plating aperture 0.25×7.25 inches. Thus, the operating parameters become:

Plating Current = 566 m.a.
Traverse Rate = 0.003 in./sec.
Traverse Time = 40.3 min.

Plating Methods

Workers are aware of methods for plating such a magnetic recording film on the order of a few micro-inches thick and with relatively high coercivity and high remanence, as well as the described "annular anisotropy". Workers will call to mind various suitable film compositions and related plating baths and plating conditions. Only "cobalt-alloy" films (i.e., Co-P and Co-Ni-P films) are believed practical for the indicated recording films. Related Co-P and Co-Ni-P plating is described in my U.S. Pat. No. 3,637,471; and may be adapted for the subject plating, as understood in the art (this patent being herewith incorporated by reference to the extent relevant). Workers will be able to select from these methods, or other suitable known plating methods, to render a good magnetic recording film on a metal substrate with the invention. It will be understood that the plated film is adapted to exhibit a relatively high coercivity (for high resolution, high density, recording—e.g., $H_c$ about 600–700 Oe.) and high remanence (e.g., about 7000 gauss).

In any event, the recording media matched to the characteristics of recording equipment of a given design for use in a high-density digital recording application will be so deposited in the equipment employed according to the invention. While plating with the described transducer-electrode, etc. (FIGS. 1–5) it will be borne in mind that the applied magnetic field must be intense enough to pre-align the deposited atoms in their plated lattice structure so as to render the desired "along-track", annular orientation.

Alternate Plating Mode

Now, workers will conceive other related ways to practice the invention. For instance, one need not plate "from the center", but may instead start at a prescribed inner radial position on the substrate-disk (e.g., from the innermost recording track of disk D in FIG. 1, just beyond the periphery of center-plug P).

Thus, the transducer/plating gap (see "g", FIG. 1) could initially be positioned to extend from the inner diameter of disk D (diameter of plug P) to its outer diameter, or entirely across the recording-radius. In this case, plating would be carried out with an initial delay in gap-translation—a delay prior to beginning transducer motion which is sufficient to plate the innermost tracks of disk D with the prescribed film thickness. Disk D will be rotated during initial plating, of course; and will continue to rotate while the plating magnet is translated outward, as before (after this initial plating, which will be equivalent to the plating experienced during translation of gap "g" from the center of plug P to the inner disk edge in the prior embodiment).

Also, where plating current ($i_p$) was kept constant before, workers will recognize that, given certain conditions (such as slower disk rotation and/or slower gap-translation), current ($i_p$) may be gradually reduced as the gap moves across the disk, from an initial maximum to a final null value ($i_p=0$ when gap "g" passes beyond the outer-most track of disk D).

While the invention has been specified for plating certain magnetic recording films, workers will recognize that other magnetic materials may also be similarly deposited—especially related "high $H_c$" alloys. Workers will also recognize that, while the above embodiments involve pre-alignment of magnetic domains along "arcuate tracks" (of magnetic recording disks), the invention may be adapted for so electroplating and pre-aligning along other track configurations [e.g., rectilinear tracks] and/or with other media, such as drums, tape, etc.

For instance, in another alternate embodiment, a similar plating-magnet head may be disposed with its transducer gap just above the surface of a magnetic recording drum, aligned parallel with the drum's rotation axis. The drum may then be rotated while plating conditions are invoked, so that this head may electroplate a uniform metallic film onto the drum surface, with the domains thereof aligned (pre-oriented) along the direction of the drum tracks ∂this array being immersed in an electrolyte under plating conditions, as above, etc.].

As workers will recognize, web or tape substrates (e.g., lated tape substrate) may also be similarly plated, under an aligning field in the plane of the plating surface, with appropriate modifications ∂e.g., electroplating a high $H_c$, high density recording film with domains aligned along a tape-length]. Other analogous applications and associated pre-oriented media will occur to those skilled in the art.

Figure 6:
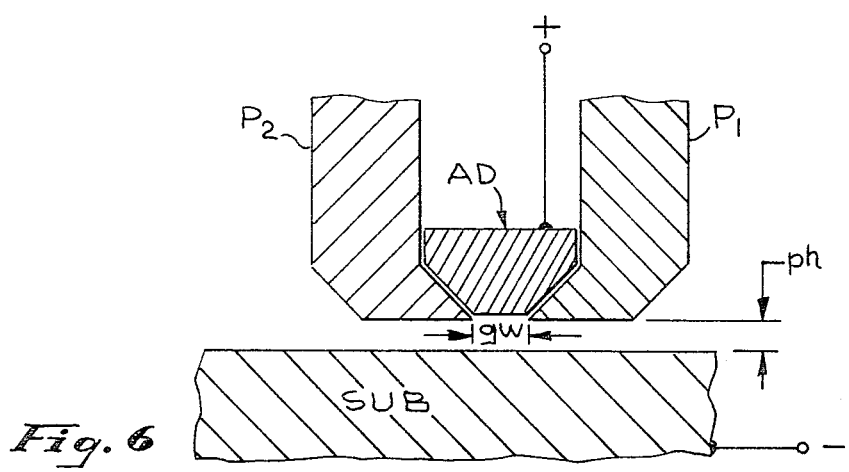
FIG. 6 is a similar schematic fragmentary sectional view of an alternate magnet-electrode combination.

Workers can also visualize alternatives to the plating arrangements described. [i.e., besides other electrolytes and plating conditions]. For instance, the anode may comprise a metal "filling" bridging the inter pole gap adjacent and transducer gap—thus, in the fashion of FIG. 6 where an anode cross-piece AD is disposed between the tips of read/write magnet poles $P_1$, $P_2$, defining transducer gap (gw). Anode AD is a non-magnetic conductor electrically isolated from the poles; and the poles are covered with insulation, as before, so that the electric field from anode AD "sees" only the cathodic substrate (SUB). The substrate is disposed at plating-gap distance "ph" from the pole tips. Anode-piece AD comprises a suitable "electrolytically-stable" material such as titanium coated with platinum or the like [preferably chemically inert and not soluble in the electrolyte and as "passive" as possible to discourage surface erosion], as known in the art. Of course, several such "plating magnets" may be used, as suggested before. to plate a given film.

It will be understood that the preferred embodiments described herein are only exemplary, and that the invention is capable of many modifications and variations in construction, arrangement and use without departing from the spirit of the invention. For example, although it has been assumed above that the medium would be electro-deposited; however, as workers can visualize, other deposition methods compatibile with such a plating magnet may be contemplated in certain instances or that further modifications of the described embodiments are also possible.

The above examples of possible variations of the present invention are merely illustrative. Accordingly, the present invention is to be considered as including all possible modifications and variations coming within the scope of the invention as defined by the appended claims.

What is claimed is:

1. A "transducer-plated" magnetic record including a prescribed substrate and a magnetic recording film applied thereon by a "mag-trode" array in a plating arrangement, this array including plating electrode means arranged to electroplate on a prescribed zone of said record and, in operative combination with said plating means, magnetic circuit means adapted to project a prescribed magnetic alignment flux onto this zone.

2. A "transducer-plated" magnetic record comprising a thin film plated upon a substrate with a plating magnet/electrode combination, this combination comprising a magnetic recording transducer and plating electrode means, the transducer including a pair of magnetic poles adapted to generate a prescribed magnetic flux, the plating electrode means being arranged to operate through said flux; these poles and electrode means being immersed in the plating electrolyte.

3. The record as recited in claim 2, as electro-plated by a "gapped-magnet" array adapted to project a magnetic flux of prescribed intensity upon a prescribed plating-zone of a prescribed plating substrate;

this array comprising a magnetic circuit element having a gap of prescribed dimensions, plus an associated plating electrode operatively associated with the magnet gap, the array being immersed in a plating electrolyte and operated so as to project plating ions and orienting flux onto the plating-zone to be magnetically pre-aligned as they deposit and so form a substantially uniaxial anisotropic magnetic recording film.

4. The record as recited in claim 3, wherein the thin film record is plated with the electrode disposed in the gap of the magnetic element.

5. The record as recited in claim 4, wherein the magnet array comprises a "gapped electromagnet" arranged and adapted to project sufficient flux, when energized, to so pre-align the deposited material.

6. The record as recited in claim 5, wherein the substrate comprises a magnetic recording disk array adapted to be controllably rotated past the magnet gap, while the plating magnet-electrode array is translated radially-outward of the disk array in a prescribed adjustable manner so as to uniformly plate a prescribed thin pre-oriented magnetic film onto the disk.

7. The record as recited in claim 6, wherein the magnet array comprises a magnetic recording transducer with a prescribed narrow inter-pole gap adapted to define the magnetic flux pattern on the plating-zone; and wherein a plating anode is disposed adjacent this gap so as to present a relatively flat anode surface parallel to the cathode and to projeect a stream of plating ions relatively uniformly through the flux pattern andd onto the plating-zone on the rotating disk, the transducer being so disposed and so activated as to project the prescribed pre-aligning magnetic flux pattern across said plating-zone given the associated plating conditions.

8. The record as recited in claim 2, wherein said record comprises a thin film electro-plated onto a prescribed substrate with a "mag-trode" wherein a plating electrode is combined with a magnetic-gap field source for "oriented plating" a prescribed surface of a magnetic record substrate, the electrode being adapted to lay down a plating pattern over a prescribed plating-zone in the plane of the medium surface and the field source adapted to present its field across this zone so as to uniformly pre-align material as it is plated there.

9. The record as recited in claim 8, wherein said field source comprises the recording gap of a magnetic transducer arrangement.

10. The record as recited in claim 2, wherein said record comprises a thin film deposited by a plating-magnet/electrode combination translatable relative to a plating substrate so as to incrementally plate on prescribed portions thereof successively.

11. A magnetic recording disk with at least one array of circumferential recording tracks on the disk substrate, each track being comprised of magnetic recording material transducer-plated onto the substrate by electroplating electrode means, while being pre-aligned by a prescribed magnetic flux imposed at the plating site by magnetic circuit means arranged in operative combination with said electrode means, the magnetic domains of each track being thereby pre-oriented, relatively circumferentially, along their track length.

12. The disk recited in claim 11, wherein said magnetic recording material has been plated while being so pre-aligned by such a flux emanating from a "gapped-magnet" arrangement adapted to project plating ions and orienting flux onto the plating zone to magnetically pre-align recording material as it is deposited and so form a substantially uniaxial, anisotropic magnetic recording film.

13. The disk as recited in claim 12, wherein said magnetic film is plated with a transducer/anode/cathode-disk arrangement immersed in a cobalt alloy electrolyte under prescribed electroplating conditions adapted to render a uniform, pre-aligned, high coercivity plated film with a thickness of from a few micro-inches to about 30 micro-inches.

14. An improved method of incrementally plating a thin magnetic film onto a substrate so as to be magnetically pre-oriented, comprising:
arranging a gapped magnetic circuit array in a plating vessel with the magnetic-gap disposed in orienting proximity to a prescribed planar plating-zone so as to present a relatively unidirectional magnetic field therealong;
disposing an anode electrode in operative relation with the magnet-gap of this circuit array so as to plate onto this plating-zone;
disposing a cathodic plating substrate surface and moving it so as to translate all recording sections successively through this plating-zone;
arranging electrolyte and invoking related plating conditions relative to the cathode substrate, anode electrode and the magnetic circuit array;
activating the magnetic circuit array so that sufficient magnetic flux is projected unidirectionally across this plating-zone to pre-align depositing material;
said substrate thus being translated relative to said circuit array and said anode electrode said pre-aligned film is uniformly deposited at a prescribed rate, the plated film thereby exhibiting the desired uniaxial magnetic anisotropy.

15. The record as recited in claim 14, wherein cobalt alloy electroplating conditions are invoked.

16. The plated product of claim 14.

17. The product plated according to the method of claim 15.

18. An improved method of incrementally plating a thin magnetic film onto a substrate so as to be magnetically pre-oriented, comprising:
arranging magnetic circuit means in a plating vessel, with the magnetic-field therefrom disposed in orienting proximity to a prescribed planar "plating-zone" on said substrate so as to present a relatively unidirectional magnetic orienting flux therealong;
disposing an anode electrode means in operative relation with this circuit means so as to plate onto this "plating-zone" with the plating current intercepting said orienting flux;
disposing said substrate in cathodic plating relating with said circuit means and electrode means and moving it so as to translate recording sections thereof successively through this "plating-zone";
arranging electrolyte and invoking related plating conditions relative to the cathode substrate, electrode means and the magnetic circuit means so that the film is uniformly deposited at a prescribed rate; activating the magnetic circuit means so that sufficient of such magnetic flux is projected unidirectionally across this plating-zone to orient and pre-align depositing material so that the plated film will exhibit a desired uniaxial magnetic anisotropy.

19. The method as recited in claim 18, wherein cobalt alloy electroplating conditions are invoked.

20. The plated product of claim 18.

21. The product plated according to the method of claim 19.

22. A method of plating thin magnetic recording films on a prescribed substrate comprising:
providing a "mag-trode" array in a plating arrangement, this array including plating electrode means arranged to electroplate on a prescribed substrate zone and, in operative combination with said plating means, magnetic circuit means adapted to project a prescribed magnetic alignment flux onto this zone; and
manipulating and translating this "mag-trode" array relative to the substrate so that the film material deposited thereon will be magnetically pre-oriented in a prescribed fashion.

23. The method as described in claim 22, wherein said "mag-trode" array is provided as a prescribed magnetic circuit means with a pair of pole portions separated by a prescribed gap; wherein the array is disposed and translated so that said pole portions confront such plating substrate and pass it in relatively intimate plating relation; and wherein the array also includes a prescribed plating electrode disposed operatively adjacent the pole portions so as to direct its plating field through said magnetic gap.

24. The method as recited in claim 22, wherein said "mag-trode" is provided by arranging a plating electrode to be disposed, translated and operated cooperatively with a magnetic recording transducer, whereby to plate film material on said substrate under the aligning influence of the magnetic flux emanating from said manetic transducer.

25. The method as recited in claim 24, wherein said substrate comprises a magnetic recording disk and wherein said substrate disk is rotated while said "mag-trode" array is concurrently translated radially with respect thereto to so-plate said film thereon such as to be pre-aligned and pre-oriented, with the "easy axis" of its magnetic domains oriented relatively circumferentially along arcuate recording paths.

26. A method of plating thin magnetic recording films on a prescribed substrate comprising:
   providing a "mag-trode" assembly, arranging it to include a U-shaped magnet with a gap portion adapted to provide high-intensity magnetic flux, plus anode means disposed within the magnetic and electrically insulated therefrom; the substrate-confronting surfaces of the magnet being disposed in close, plating, proximity to the substrate, while being electrically insulated so as to project no significant electric field to the substrate except from adjacent the gap portion; and
   disposing this magnet-anode assembly operationally adjacent the substrate in plating relation therewith and arranged to be operated so that plating current flows from the anode to the substrate while passing through said gap portions of the magnet and so intercepting the magnetic flux therefrom as to pre-orient depositing material.

27. The method as recited in claim 26, wherein said substrate comprises a disk having arcuate record track sites thereon; and
   wherein said magnet-anode assembly is disposed relative to the substrate disk so that the magnet poles define an intermediate gap across an intermediate gap-axis, with the gap-axis disposed relatively parallel to the disk surface and so as to maintain a relatively narrow orienting-flux zone along the disk surface.

28. The method as recited in claim 27, wherein the flux from said magnet poles and the plaing field from said anode intercept and are oriented so as to maintain a prescribed constant alignment of the magnetic domains of the so-plated film, with the "easy" axis aligned along the direction of the track sites in uniaxial magnetic anistropy.

29. The method as recited in claim 22, wherein said "mag-trode" comprises a magnetic transducer including pole magnet means arranged and adapted to direct a prescribed magnetic flux along a substrate zone plus a plating electrode arranged and adapted to project a prescribed plating field on the same substrate zone conjunctively with this flux; wherein plating conditions are established to maintain a relatively constant plating current from the electrode; and wherein the transducer-electrode combination is translated across the substrate at a relatively constant velocity $v_t$, the substrate being concurrently translated in a second direction at a relatively constant velocity $v_s$.

30. The method as recited in claim 29, wherein the poles of said transducer and said electrode are so configured and so operated that each plating area "sees" relatively the same total plating current to form relatively the same plating thickness and wherein said electrode is comprised of relatively non-magnetic magnetic material.

31. The method as recited in claim 30, wherein said plating arrangement is arranged and operated to plate a relatively high coercivity film, on the order of 300 to 1000 Oersteds.

32. The method as recited in claim 31, wherein said plating electrode and related means are arranged and operated in conjunction with a plating array including a Cobalt-Nickel-Phosphorus electrolyte in which the transducer electrode assembly is submersed for such plating.

33. A method of plating thin magnetic recording films along recording tracks on a prescribed disk substrate that the magnetic domains are "pre-oriented", with their "easy" switching axis oriented relatively along said recording tracks, this method including the steps of:
   arranging plating electrode means to apply a prescribed plating current to the substrate and to be translated radially across said disk substrate;
   while also rotating the substrate in said track direction;
   while concurrently also providing magnetic field means and translating it conjointly with the electrode means, with the field means directing a relatively intense magnetic flux along each successive plating zone of the disk conjunctively with application of the plating current; and
   concurrently invoking related plating conditions adapted to deposit said thin magnetic film so that said "easy" axis is aligned relatively along the tracks.

34. A magnetic record disk comprising a disk substrate and at least one circumferential magnetic recording zone on the surface of the substrate, each such zone comprising a concentric array of circumferential recording tracks formed of deposited magnetic recording material, the magnetic domains of each track having been magnetically pre-oriented during deposition to be aligned relatively circumferentially, along the track length.

35. A magnetic recording disk comprising a disk substrate, at least one array of annular recording tracks on the substrate, each track being comprised of magnetic recording material "transducer-deposited" along the track site while being pre-aligned by a prescribed magnetic flux imposed at the plating site by prescribed transducer means, the magnetic domains of each track being thereby pre-oriented to align along their track length.

* * * * *